United States Patent [19]
Baelder et al.

[11] 3,822,046
[45] July 2, 1974

[54] RETRACTOR FOR SAFETY BELTS ESPECIALLY FOR MOTOR VEHICLES

[75] Inventors: Arnold Baelder, Norderstedt; Uwe Peters, Hamburg, both of Germany

[73] Assignee: Klippan GmbH, Konfurth, Germany

[22] Filed: Aug. 30, 1972

[21] Appl. No.: 284,846

[30] Foreign Application Priority Data
Sept. 3, 1971 Germany............................ 2144207

[52] U.S. Cl. ........................ 242/107.4, 242/107 SB
[51] Int. Cl....................... A62b 35/02, B65h 63/04
[58] Field of Search ....... 242/107.4, 107 SB, 107 R, 242/107.2, 107.3; 297/386, 388; 280/150 SB

[56] References Cited
UNITED STATES PATENTS

| | | | |
|---|---|---|---|
| 3,018,065 | 1/1962 | Cushman | 242/107.4 |
| 3,430,891 | 3/1969 | Burleigh | 242/107.4 |
| 3,450,368 | 6/1969 | Glauser | 242/107.4 |
| 3,482,799 | 12/1969 | Wrighton | 242/107.4 |
| 3,593,942 | 7/1971 | Rex | 242/107.4 |
| 3,604,655 | 9/1971 | Jones | 242/107.4 |
| 3,698,657 | 10/1972 | Kirchhoff | 242/107.4 |

*Primary Examiner*—John W. Huckert
*Assistant Examiner*—Jon W. Henry
*Attorney, Agent, or Firm*—John P. Kirby, Jr.; Jonathan Plaut

[57] ABSTRACT

A belt retractor for safety belts including, in addition to a conventional latching mechanism, sensing means for sensing small values of belt withdrawal acceleration and operating means for actuating the latching mechanism. A guide disc is movably connected to a plurality of locking members serving merely as release means for actuating sensor arms and detents which block the belt roller. For more positive blocking of the roller, the latching mechanism may include a pair of ratchet wheels operationally coupled to the respective actuating means.

11 Claims, 8 Drawing Figures

RETRACTOR FOR SAFETY BELTS ESPECIALLY FOR MOTOR VEHICLES

BACKGROUND OF THE INVENTION

The present invention relates to a retractor device for safety belts, especially for motor vehicles. The type of retractor device here contemplated comprises a spring biased axle pivotally mounted in a retractor casing, a belt take-up shaft concentrically to the retractor axle, at least one ratchet wheel coupled to the shaft, and a spring biased latch member rotatably mounted in the casing whereby this latch member includes a locking arm adapted to engage one of the ratchet wheels when blocking the retractor.

In retractor devices of the aforedescribed type as disclosed, e.g., in the German Pat. No. 1,249,704 the belt roller will be blocked when almost the full belt length has been withdrawn from the belt roller, by a disc frictionally engaging a ratchet wheel. When the belt has been withdrawn or unwound and then a short belt length is taken up again, this disc will be entrained into a position in which the disc releases the latch to engage a ratchet wheel. As a consequence thereof, when initially unwinding the belt almost entirely from the belt roller or when fastening the safety belt for the first time, the belt roller remains in its blocked condition. For the convenience of the passenger it is however desired that the belt allows forward movements of the upper part of the body even after the belt has been fastened, i.e., the belt may be paid out and is not blocked against further withdrawal from the roller under normal driving conditions, since under these conditions the freedom of movement of the passenger is less interfered with.

In prior art safety belt retractor devices of the aforedescribed type the belt roller will be blocked and thereby prevent any further withdrawal of the safety belt from the roller when the value of the belt withdrawal acceleration exceeds a predetermined limit.

As an improvement over this type of belt retractors which are adapted to become blocked in dependence upon the belt withdrawal acceleration there has also been suggested, by the laying-open of German Specification No. 1,964,128, to rotatably mount an inertia member on the shaft of the belt roller whereby a locking member likewise mounted on this shaft abuts the inertia member. At high angular accelerations of the shaft the locking member will be moved by the rotation of the inertia member relatively to the shaft into a position in which the locking member engages a stationary abutment so that the shaft is locked against further rotational movement. In this arrangement, the locking member must transmit the total belt tension force onto the casing. As will be readily apparent to the one skilled in the art, the locking member must be relatively big and rigid. Therefore, the mass of the locking member is likewise relatively large. This, however, substantially impairs the correct operation or a high response of the belt retractor device to small variations of the belt withdrawal acceleration.

Another drawback of this prior art device is that the tip of the tooth of the locking member may coincide with the tip of a tooth of the stationary abutment. This entails a considerable tip loading, and furthermore a correct engagement of the locking member with the abutment is not readily ensured.

SUMMARY OF THE INVENTION

It is therefore an object of the present invention to provide a novel and improved retractor device for safety belts, especially for motor vehicles.

It is another object of the present invention to provide a retractor device for safety belts which is adapted to become blocked in dependence upon the actual value of the belt withdrawal acceleration, by displacement of one or several locking members wherein such locking members, however, do not directly effect the locking operation but merely serve to initiate this locking operation by actuating a latching mechanism known per se.

It is another object of the present invention to provide a retractor device for safety belts of the type defined above having relatively small and light locking members thus improving the operational reliability of the retractor device.

In accordance with the present invention, these objects are achieved by a retractor device having a guide disc freely rotatably mounted on the retractor axis, a plurality of locking members being provided and movably connected to the guide disc, the spacing of the tips of the locking members from the retractor axis increasing due to inertia forces when unwinding the safety belt with a certain acceleration, the latch member including a sensor arm disposed in the plane of rotation of the locking members and being adapted, when acceleratedly unwinding the safety belt, to be biased so that the locking arm engages one of the ratchet wheels to block the belt roller.

In this proposed arrangement, the locking members constitute merely means to release the latching mechanism. Since in this operation the locking members do not have to transmit any significant forces to effect locking of the belt roller, the locking members may be of relatively small mass. An additional advantage is that the locking members may be arranged so that any chance of teeth tips of the latching means coinciding with the teeth tips or a tooth tip of a ratchet wheel is safely avoided.

In accordance with another embodiment of the present invention it has been found to be suitable to mount a plurality of locking members in equal spacings about a peripheral portion of the guide disc since when providing a latching mechanism on one side of one ratchet wheel only or on one side of a pair of ratchet wheels the latching mechanism may be actuated when rotating the belt roller through an angle up to a quarter turn. Therefore, merely an extremely short belt portion must be withdrawn when intending to release the blocking of the belt roller. It has been shown to be sufficient when connecting approximately four locking members to a guide disc whereby only one locking member is required to block the belt roller.

In accordance with another feature of the present invention the locking members may consist of segments and include a preferably radially extending abutment shoulder facing the direction of rotation so that this shoulder may strike an almost co-directionally extending sensor arm of the latching mechanism and abuts this arm in a more or less full surface engagement in the blocking position.

The invention furthermore provides that the locking members are coupled to the guide disc by a return spring serving to move the locking members back into their release positions as soon as the belt tension is removed.

Instead of locking members in the form of segment discs the locking members may also consist of pins slidably guided in mating guideways in the guide disc. Thereby the pins are preferably rotatably mounted on an entrainment disc rigidly connected to the retractor axis. When with this arrangement the guide disc is decelerated by inertia forces the pins may rotate outwardly into an inclined position whereby the spacing of the pin tips from the center of the retractor axis increases by a distance so that when the guide disc rotates further the pins may engage the sensor arm of the latching mechanism to release the same. Toward this end, the pins may be slidably guided in guide disc bores extending substantially in a tangential direction of the retractor axis. In such an arrangement, the guide disc and the entrainment disc are preferably coupled by at least one return spring serving to automatically reset the blocking means.

Since the guide disc with the locking members rotates at a rotational speed similar to the one of the adjacent ratchet wheel or the shaft, respectively, even allowing for a temporary small deceleration, the locking members may be arranged with respect to the tips of the ratchet wheels in the direction of rotation such that the latching mechanism will be released by a locking member at a time in which the tip of the latch member cannot coincide with the position of a tip of the ratchet wheel. Thus this expedient likewise contributes to increase the reliability of operation. As another improvement on the reliability of operation may be considered that the locking members need only be provided on one side of the casing whereas the shaft may be provided with a ratchet wheel at either end thereof, each ratchet wheel being adapted to be engaged by an associated locking arm of the latching mechanism when only one sensor arm of this latching mechanism is biased by only one of the locking members. This feature assures an even distribution of forces on both sides of the belt retractor casing.

DESCRIPTION OF THE DRAWINGS

In the following, two exemplary embodiments of the present invention will be described with reference to the appended drawings wherein.

DETAILED DESCRIPTION

Figure 1:
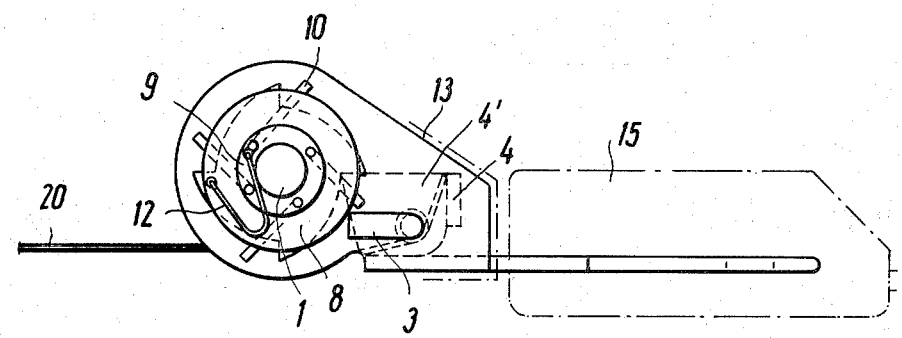
FIG. 1 is a schematical lateral elevational view of a belt retractor provided with pin type locking members.
Figure 2:
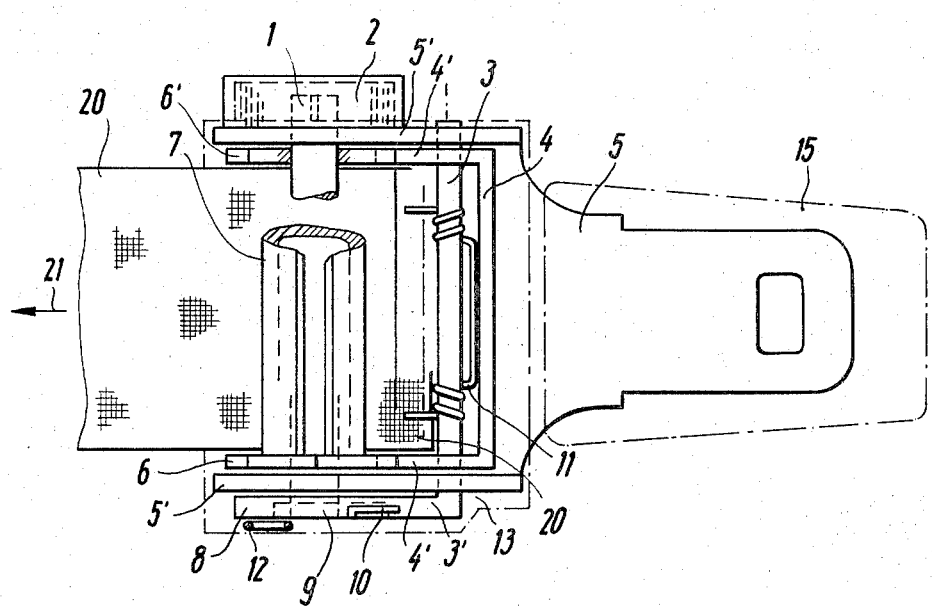
FIG. 2 is a top view of the retractor shown in FIG. 1.
Figure 3:
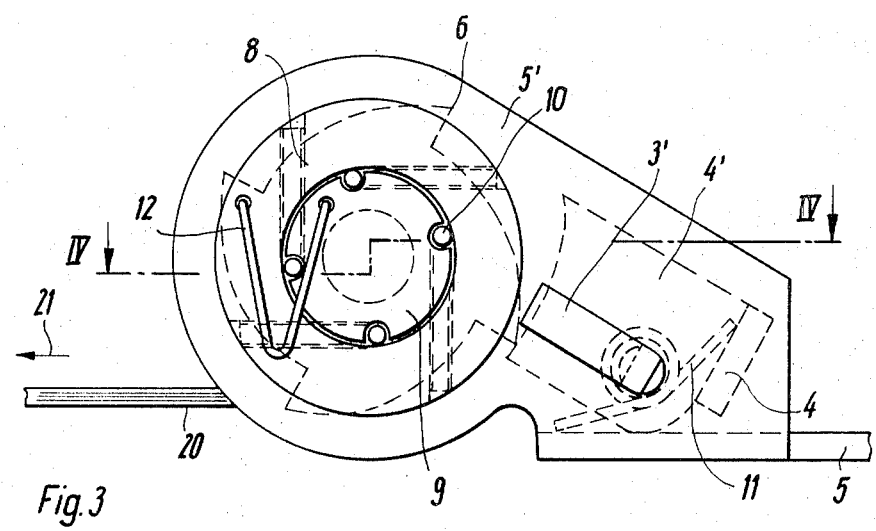
FIG. 3 is an enlarged lateral elevational view of the blocking mechanism in the release position.
Figure 4:
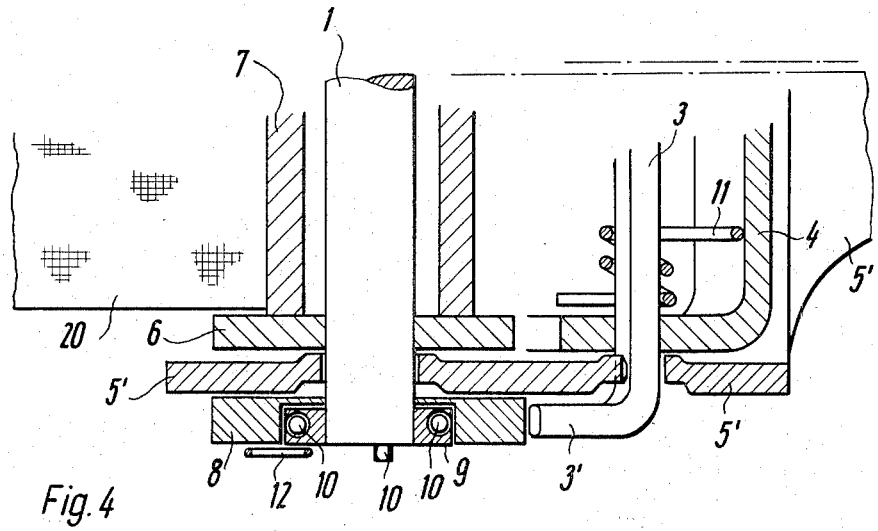
FIG. 4 is a partial cross-sectional view of the retractor along the line IV—IV of FIG. 3.
Figure 5:
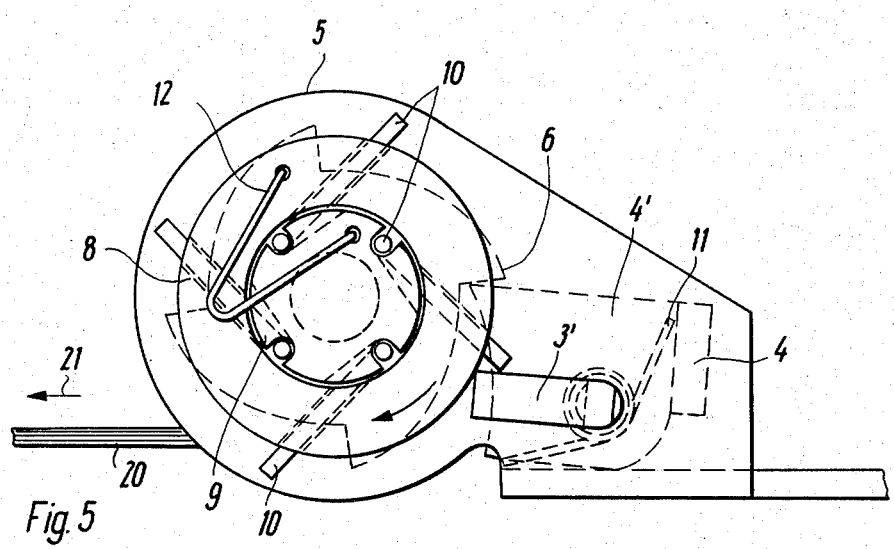
FIG. 5 is an enlarged lateral elevational view of the blocking mechanism of FIGS. 1-4 in the blocking position.
Figure 6:
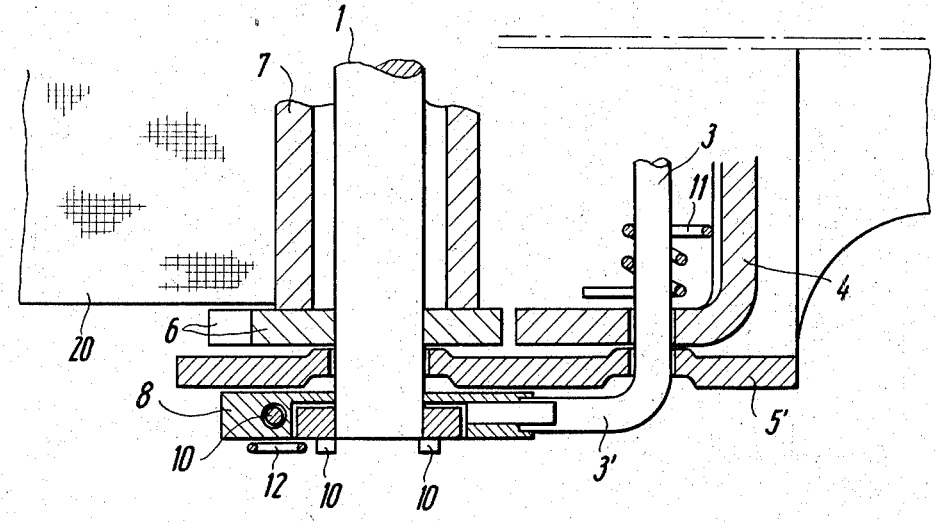
FIG. 6 is a partial cross-sectional view of the retractor shown in FIG. 5.

Referring to FIGS. 1-6, the illustrated belt retractor device includes a substantially U-shaped casing consisting of a bottom plate 5 to which a pair of lateral walls 5' is attached. The bottom plate 5 of the casing may be in the form of a tongue of a buckle by which the retractor may be coupled to another belt member or the like, or alternatively may be arranged so as to be rigidly mounted on the chassis of a vehicle.

An axle 1 is rotatably mounted in the lateral walls 5'. This axle 1 is coupled, exteriorly of one of the lateral casing walls 5', to a spring 2 serving to take up the belt 20. The other end of the rotatably mounted axle 1 mounts a rigidly connected entrainment disc 9 disposed exteriorly of the lateral casing wall 5'.

A pair of ratchet wheels 6 and 6' is disposed adjacent the inner sides of the two lateral casing walls 5'. These ratchet wheels 6 and 6' are rigidly mounted on a shaft 7 disposed concentrically to the retractor axle 1. The shaft 7 serves to take up the belt 20.

Another axle 3 of a latching mechanism is likewise rotatably mounted on the two lateral casing walls 5'. Exteriorly of one lateral wall 5' this axis 3 mounts a sensor arm 3'. A yoke 4 is fixedly secured to the axle 3. The yoke 4 has two legs each defining a detent 4'. The yoke 4 together with the detents 4' is normally biased by a coil spring 11 into the release position shown in FIG. 3. In this release position, the front edges of the two detents 4' are removed from the path of rotation of the two ratchet wheels 6 and 6', as may be seen in FIG. 3.

The periphery of an entrainment disc 9 is provided with four recesses into which engage terminal bent hook portions of four entrainment lugs 10 which may operate as locking members in the aforedescribed meaning. These entrainment lugs 10 or locking members extend through bores of a guide disc 8. The guide disc 8 is coupled to the entrainment disc 9 by a return spring 12 having the form of a fork-shaped wire. The return spring 12 is of a comparatively small spring constant so that when instantaneously altering the velocity of belt withdrawal from the shaft 7 the guide disc 8 lags behind the entrainment disc 9. Thereby the several entrainment lugs 10 are rotated outwardly about the axes of their hook portions extending through the recesses of the entrainment disc 9, as may best be seen in FIG. 5. During this movement, the spacing of the tips of these hook portions from the center of the axle 1 is altered, i.e., becomes greater. Consequently, the entrainment lug 10 closest to the sensor arm 3' strikes the sensor arm 3'. Thereby the axle 3 is rotated in a direction opposite to the direction of rotation of the axle 1, i.e. counterclockwise so that the tips of the detents 4' are moved into the path of rotation of the teeth of the ratchet wheels 6 and 6', respectively, and thus block the belt retractor device and prevent any further withdrawal of belt in the direction of the arrow 21.

Figure 7:
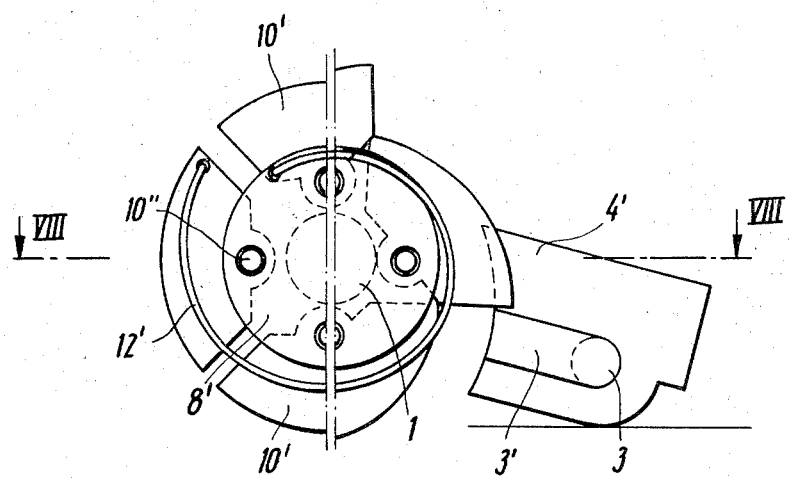
FIG. 7 is a lateral elevational view of a blocking mechanism having rotary segments instead of pins.
Figure 8:
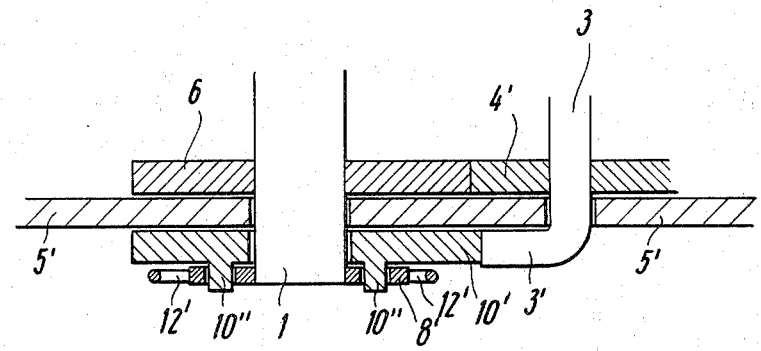
FIG. 8 is a partial cross-sectional view of the arrangement along the line VIII—VII shown in FIG. 7.

Referring to FIGS. 7 and 8, the belt retractor device shown therein is similar to the one of FIGS. 1-6 but differs from the aforedescribed embodiment essentially in that the locking members 10 consist in this second embodiment of segments 10' having the shape of a disc and there are four members of this type provided with pins 10'' and equally spaced about a peripheral portion of the guide disc. In the second embodiment, the guide disc 8' is rotatably mounted on and likewise rotates with the axle 1. The guide disc 8' is coupled by a single spring 12' of a substantially coil spring configuration to a single segment 10. In this manner, all four segments 10' of locking member are retained in a normal or neutral position shown in the left hand portion of FIG. 7. However, when withdrawal of the belt exceeds a predetermined limit of acceleration, the four segments 10' lag, due to inertia during rotation of the guide disc 8, while rotating about the axle of their respective pins 10''. As a consequence, the tips of the substantially radially extending front edges of the segments move outward radially by this counterclockwise rotation. The segments then assume the position shown in the right hand portion of FIG. 7. In this position, the first segment 10' disposed above the sensor arm 3' of the locking mechanism strikes the sensor arm 3' and urges the latter downwardly so that the two detents 4' may again engage the two ratchet wheels 6 or 6', respectively, that are mounted on the retractor axis 1. In this second embodiment, the locking members 10 likewise merely define release means for actuating the latching mechanisms, axle 3, sensor arm 3', yoke 4 and detents 4', respectively which block the belt roller.

With this design the locking members need merely transmit small forces and may therefore be made relatively light so that the members correctly respond even to small variations of acceleration.

Other modifications and variations of the invention, as hereinbefore set forth, may be made without departing from the spirit and scope thereof, and therefore only such limitations should be imposed as are indicated in the appended claims.

The embodiments of the invention in which an exclusive property or privilege is claimed are defined as follows:

1. A retractor device for safety belts, especially for motor vehicles, comprising: a casing; a retractor axle rotatably mounted in said casing; a shaft mounted concentrically to said axle and adapted to wind and unwind said safety belt on said shaft; a biasing means connected to said axle, biasing said axle to wind said safety belt on said shaft; a ratchet wheel mounted on said shaft; a latch member rotatably mounted in said casing, said latch member including a locking arm adapted to engage said ratchet wheel when blocking said retractor device; a biasing means connected to said latch member, biasing said latch member away from said ratchet wheel; a guide disc rotatably mounted on said retractor axle, said guide disc being a release means for actuating said latch member; a plurality of locking members rotatably connected to said guide disc, said locking members having tips, the spacing of said tips of said locking members from said retractor axle increasing by inertia when the unwinding of said safety belt is accelerated, said latch member including a sensor arm disposed in the plane of rotation of said locking members, said sensor arm being connected to said latching member and being adapted to sense small amounts of acceleration in the unwinding of said belt and to actuate said locking arm to engage said ratchet wheel.

2. A retractor device for safety belts according to claim 1 wherein said plurality of locking members are equally spaced about a peripheral portion of said guide disc.

3. A retractor device for safety belts according to claim 1 wherein said plurality of locking members comprises four locking members which are connected to said guide disc.

4. A retractor device for safety belts according to claim 1 wherein said locking members comprise: segments having outer peripheries lying in an approximate circle, said segments having tips which move outward radially during rotation.

5. A retractor device for safety belts according to claim 4 and further comprises a coil spring coupling said guide disc to one of said segments.

6. A retractor device for safety belts according to claim 1 wherein said guide disc has bores and said locking members comprise entrainment lugs, said entrainment lugs extending through said bores in said guide disc.

7. A retractor device for safety belts according to claim 6 and further comprising: an entrainment disc rigidly connected to said retractor axle, said entrainment disc engaging portions of said entrainment lugs.

8. A retractor device for safety belts according to claim 6 wherein said bores in said guide disc extend substantially in a direction tangential of said retractor axle.

9. A retractor device for safety belts according to claim 7 and further comprising a return spring coupling said guide disc to said entrainment disc.

10. A retractor device for safety belts according to claim 1 wherein said locking members are arranged on one side of said casing, said shaft has a second ratchet wheel, one ratchet wheel mounted at one end of said shaft and the second ratchet wheel mounted at the other end of said shaft, and said latch member has a second locking arm, each ratchet wheel being adapted to be engaged by a locking arm of said latch member.

11. A retractor device according to claim 1 wherein said latch member comprises a yoke and an axle to which said yoke is fixedly secured, said sensor arm being mounted on said axle.

* * * * *